United States Patent
Kolbeck et al.

(10) Patent No.: US 11,162,832 B2
(45) Date of Patent: Nov. 2, 2021

(54) PRESSURE COMPENSATION FOR A VIBRATING FLOWMETER AND RELATED METHOD

(71) Applicant: Micro Motion, Inc., Boulder, CO (US)

(72) Inventors: Andrew G. Kolbeck, Boulder, CO (US); Aart R. Pruysen, Ede (NL); Dean M. Standiford, Loveland, CO (US); Jacob Andreas Sinte Maartensdijk, Rhenen (NL)

(73) Assignee: Micro Motion, Inc., Boulder, CO (US)

( * ) Notice: Subject to any disclaimer, the term of this patent is extended or adjusted under 35 U.S.C. 154(b) by 168 days.

(21) Appl. No.: 16/068,513

(22) PCT Filed: Feb. 4, 2016

(86) PCT No.: PCT/US2016/016578
§ 371 (c)(1),
(2) Date: Jul. 6, 2018

(87) PCT Pub. No.: WO2017/135954
PCT Pub. Date: Aug. 10, 2017

(65) Prior Publication Data
US 2019/0154488 A1    May 23, 2019

(51) Int. Cl.
*G01F 15/02*    (2006.01)
*G01F 1/84*    (2006.01)

(52) U.S. Cl.
CPC .......... *G01F 15/024* (2013.01); *G01F 1/8436* (2013.01)

(58) Field of Classification Search
None
See application file for complete search history.

(56) References Cited

U.S. PATENT DOCUMENTS

| | | | |
|---|---|---|---|
| 2003/0055580 A1* | 3/2003 | Normen | G01F 1/8418 702/45 |
| 2006/0173639 A1* | 8/2006 | Carpenter | G01F 1/8413 702/50 |
| 2007/0028663 A1 | 2/2007 | Patten et al. | |
| 2007/0245832 A1* | 10/2007 | Schlosser | G01F 1/8409 73/861.01 |
| 2015/0226597 A1* | 8/2015 | Gaspard, Jr. | G01F 25/0007 73/1.16 |

FOREIGN PATENT DOCUMENTS

| | | |
|---|---|---|
| WO | 9807009 A1 | 2/1998 |
| WO | 2004011894 A1 | 2/2004 |
| WO | 2005040733 A1 | 5/2005 |
| WO | 2005050145 A1 | 6/2005 |

* cited by examiner

*Primary Examiner* — Paul M. West
*Assistant Examiner* — Mark A Shabman
(74) *Attorney, Agent, or Firm* — The Ollila Law Group LLC (57) ABSTRACT

A method for calibrating a flowmeter (5) is provided. A relationship between a flow calibration factor and a pressure coefficient for a class of flowmeter is determined. A unique flow calibration factor is then determined for a flowmeter (5). A unique pressure coefficient for the flowmeter (5) is determined, and the unique pressure coefficient is applied to the flowmeter (5).

17 Claims, 4 Drawing Sheets

PRESSURE COMPENSATION FOR A VIBRATING FLOWMETER AND RELATED METHOD

TECHNICAL FIELD

The present invention relates to flowmeters, and more particularly to a method and apparatus for determining and applying pressure compensation to a vibrating flowmeter.

BACKGROUND OF THE INVENTION

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired flow tube amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Generally, a Coriolis flowmeter can be initially calibrated and a flow calibration factor along with a zero offset can be generated. In use, the flow calibration factor (FCF) can be multiplied by the time delay measured by the pickoffs (ΔT) minus the zero offset (ΔT$_0$) to generate a mass flow rate. Such mass flow calibrations may be represented by two calibration constants, which are equivalent to the slope (FCF) and intercept (zero offset) of a straight line. An example of a mass flow rate equation utilizing a flow calibration factor (FCF) and a zero offset (ΔT$_0$) is described by Equation (1):

$$\dot{m} = \text{FCF}(\Delta T_{measured} - \Delta T_0) \quad (1)$$

Where:
$\dot{m}$ = mass flow rate
FCF = flow calibration factor
$\Delta T_{measured}$ = measured time delay
$\Delta T_0$ = initial zero offset In most situations, the flowmeter is initially calibrated, typically by the manufacturer, and assumed to provide accurate measurements without subsequent calibrations required. The amount of Coriolis force measured is largely based on the stiffness of the flow tube(s) and directly proportional to the mass flow rate of the fluid flowing through the flow tube(s). This relationship is reflected by the FCF for each flowmeter. Most corrections to Coriolis mass flowmeters are then based on tube(s) stiffness changes as process and/or environmental conditions such as pressure and temperature, for example, change away from the factory calibration conditions.

In addition, a pressure compensation may be utilized to correct Coriolis mass flowmeters for changes in process fluid pressure from the initial factory calibration fluid pressure. Typically, a pressure coefficient is a predefined constant determined for a particular model of Coriolis mass flowmeter. However, variations caused by tolerances in the manufacturing processes and tolerances in flow tube construction render flowmeters with variations such that a predefined constant may not be particularly accurate.

Therefore, there is a need in the art for an apparatus and method to determine and apply an accurate and individualized pressure coefficient to a particular flowmeter.

The present invention overcomes the above difficulties and other problems and an advance in the art is achieved.

SUMMARY OF THE INVENTION

A method for calibrating a flowmeter is provided according to an embodiment. The method comprises determining a relationship between a flow calibration factor and a pressure coefficient value (PCV) for a class of flowmeter. A unique flow calibration factor for a flowmeter is determined, and a unique pressure compensation value is calculated for the flowmeter with the unique flow calibration factor. The unique pressure compensation value is applied to the flowmeter.

A flowmeter configured to measure a property of a process fluid therein is provided according to an embodiment. The flowmeter comprises a meter electronics comprising a processing system and a storage system. A plurality of pickoffs is affixed to flowmeter conduits in communication with the meter electronics. A driver is affixed to flowmeter conduits in communication with the meter electronics. The meter electronics is configured to measure a fluid flow of a process fluid in a sensor assembly and to determine at least one fluid characteristic of the process fluid. The meter electronics is configured to apply a unique flow calibration factor and a unique coefficient value to fluid characteristic calculations.

Aspects

A method for calibrating a flowmeter is provided according to an aspect. The method comprises the steps of:

determining a relationship between a flow calibration factor and a pressure coefficient value (PCV) for a class of flowmeter; determining a unique flow calibration factor for a flowmeter; calculating a unique pressure compensation value for the flowmeter with the unique flow calibration factor; and applying the unique pressure compensation value to the flowmeter.

Preferably, the flowmeter is a Coriolis mass flowmeter.

Preferably, the step of determining a relationship between a flow calibration factor and a pressure compensation value for a class of flowmeter comprises the step of determining an initial zero offset.

Preferably, the step of applying the unique pressure compensation value to the flowmeter comprises storing the unique pressure compensation value in a meter electronics.

Preferably, the method comprises the step of measuring a process fluid introduced into the flowmeter, wherein the measurement is adjusted with the unique pressure compensation and the unique flow calibration factor.

Preferably, the step of measuring a process fluid comprises measuring a mass flow rate.

Preferably, the mass flow rate is determined using an equation comprising: $\dot{m}=FCF \cdot PCV \ (\Delta T_{measured} - \Delta T_0)$, wherein:
$\dot{m}$ is a mass flow rate;
FCF is the unique flow calibration factor;
PCV is the unique pressure coefficient
$\Delta T_{measured}$ is a measured time delay;
$\Delta T_0$ is an initial zero offset.

Preferably, the mass flow rate is determined using an equation comprising: $\dot{m}=FCF \cdot (1+(P_A-P_B) \cdot PCV) \cdot (\Delta T_{measured} - \Delta T_0)$, wherein:
$\dot{m}$ is a mass flow rate;
FCF is the unique flow calibration factor;
PCV is the unique pressure coefficient;
$\Delta T_{measured}$ is a measured time delay;
$\Delta T_0$ is an initial zero offset;
$P_A$=Flow pressure; and
$P_B$=Base pressure.

Preferably, the relationship between the flow calibration factor and the pressure coefficient for the class of flowmeter is linear.

Preferably, the unique pressure coefficient comprises a base pressure compensation value summed with an adjustment factor.

A flowmeter configured to measure a property of a process fluid therein is provided according to an aspect. The flowmeter comprises a meter electronics comprising a processing system and a storage system; a plurality of pickoffs affixed to flowmeter conduits in communication with the meter electronics; a driver affixed to flowmeter conduits in communication with the meter electronics; wherein the meter electronics is configured to measure a fluid flow of a process fluid in a sensor assembly and to determine at least one fluid characteristic of the process fluid; wherein the meter electronics is configured to apply a unique flow calibration factor to fluid characteristic calculations; and wherein the meter electronics is configured to apply a unique coefficient value to fluid characteristic calculations.

Preferably, the flowmeter comprises a Coriolis mass flowmeter.

Preferably, a mass flow rate is calculated and adjusted with the unique pressure coefficient and the unique flow calibration factor.

Preferably, the mass flow rate is determined using an equation comprising: $\dot{m}=FCF \cdot PCV \ (\Delta T_{measured} - \Delta T_0)$, wherein:
$\dot{m}$ is a mass flow rate;
FCF is the unique flow calibration factor;
PCV is the unique pressure coefficient;
$\Delta T_{measured}$ is a measured time delay;
$\Delta T_0$ is an initial zero offset.

Preferably, the mass flow rate is determined using an equation comprising: $\dot{m}=FCF \cdot (1+(P_A-P_B) \cdot PCV) \cdot (\Delta T_{measured} - \Delta T_0)$, wherein:
$\dot{m}$ is a mass flow rate;
FCF is the unique flow calibration factor;
PCV is the unique pressure coefficient;
$\Delta T_{measured}$ is a measured time delay;
$\Delta T_0$ is an initial zero offset;
$P_A$=Flow pressure; and
$P_B$=Base pressure.

Preferably, the relationship between the flow calibration factor and the pressure coefficient is linear.

Preferably, the unique pressure coefficient comprises a base pressure compensation value summed with an adjustment factor.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention, and will appreciate that the features described below can be combined in various ways to form multiple variations of the invention. As a result, the invention is not limited to the specific examples described below, but only by the claims and their equivalents.

Figure 1:
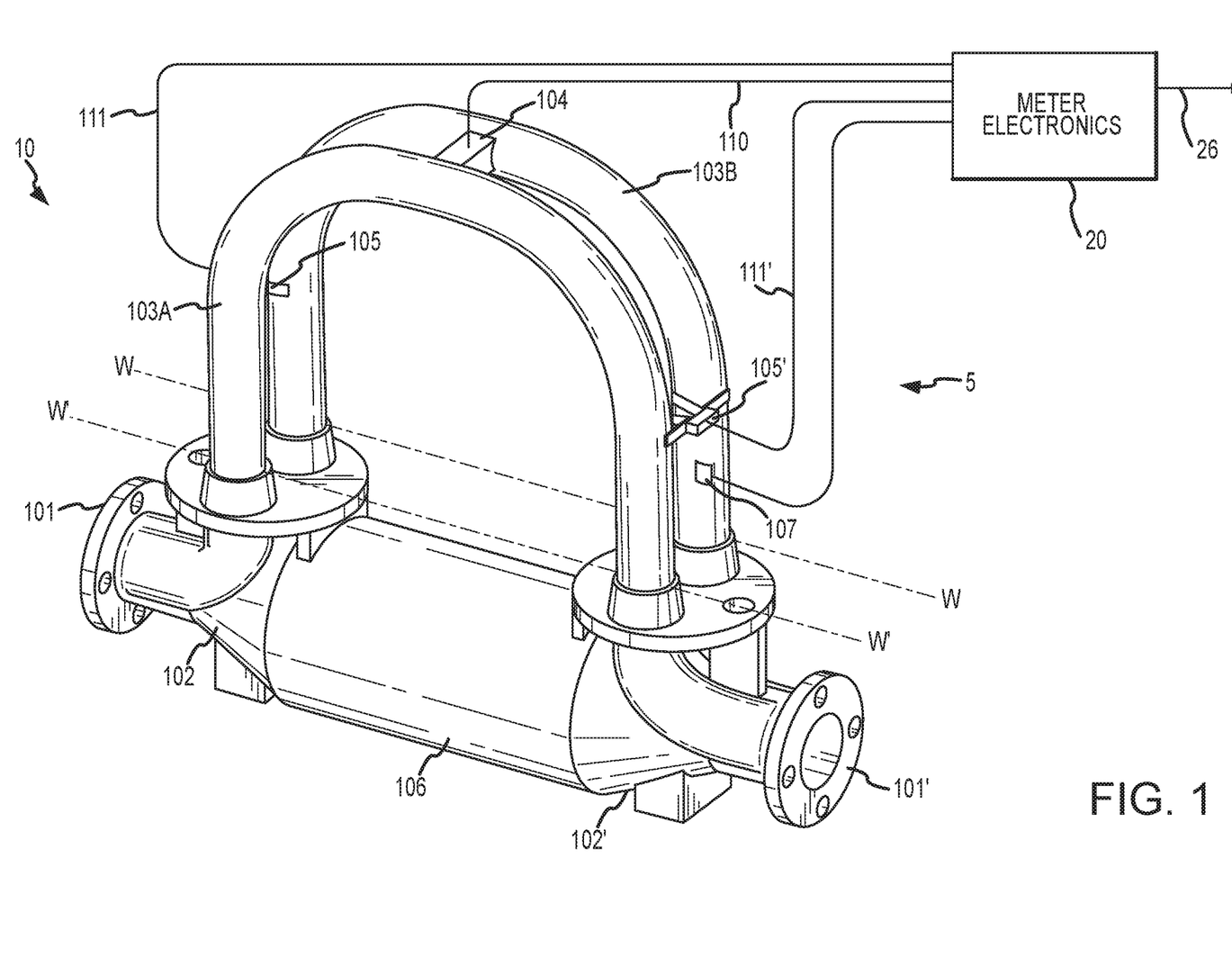
FIG. 1 shows a vibrating sensor assembly according to an embodiment.

FIG. 1 illustrates an example of a flowmeter 5 in the form of a Coriolis flowmeter comprising a sensor assembly 10 and one or more meter electronics 20. The one or more meter electronics 20 are connected to sensor assembly 10 to measure a characteristic of a flowing material, such as, for example, density, pressure, mass flow rate, volume flow rate, totalized mass flow, temperature, and other information.

The sensor assembly 10 includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 103A and 103B. The conduits 103A and 103B extend outwardly from the manifolds 102 and 102' in an essentially parallel fashion. When the sensor assembly 10 is inserted into a pipeline system (not shown) which carries the flowing material, the material enters sensor assembly 10 through flange 101, passes through inlet manifold 102 where the total amount of material is directed to enter conduits 103A and 103B, flows through conduits 103A and 103B and back into outlet manifold 102' where it exits the sensor assembly 10 through the flange 101'.

The sensor assembly 10 includes a driver 104. The driver 104 is affixed to conduits 103A and 103B in a position where the driver 104 can vibrate the conduits 103A, 103B in the drive mode. More particularly, the driver 104 includes a first driver component (not shown) affixed to conduit 103A, and a second driver component (not shown) affixed to conduit 103B. The driver 104 may comprise one of many well-known arrangements, such as a magnet mounted to the conduit 103A and an opposing coil mounted to the conduit 103B.

In the present example, the drive mode is the first out of phase bending mode, and the conduits 103A and 103B are preferably selected and appropriately mounted to inlet manifold 102 and outlet manifold 102' so as to provide a balanced system having substantially the same mass distribution, moments of inertia, and elastic moduli about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by one or more meter electronics 20, such as for example via lead 110, and passed through the coil to cause both conduits 103A, 103B to oscillate. Those of ordinary skill in the art will appreciate that other driver types and drive modes may be used within the scope of the present invention.

The sensor assembly 10 shown includes a pair of pickoffs 105, 105' that are affixed to conduits 103A, 103B. More particularly, a first pickoff component (not shown) is located on conduit 103A, and a second pickoff component (not shown) is located on conduit 103B. In the embodiment depicted, the pickoffs 105, 105' may be electromagnetic detectors, for example—pickoff magnets and pickoff coils that produce pickoff signals that represent the velocity and position of the conduits 103A, 103B. For example, the pickoffs 105, 105' may supply pickoff signals to the one or more meter electronics via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

It should be appreciated that while the sensor assembly 10 described above comprises a dual flow conduit flowmeter, it is well within the scope of the present invention to implement a single conduit flowmeter. Furthermore, while the flow conduits 103A, 103B are shown as comprising a curved flow conduit configuration, the present invention may be implemented with a flowmeter comprising a straight flow conduit configuration. Therefore, the particular embodiment of the sensor assembly 10 described above is merely one example and should in no way limit the scope of the present invention.

In the example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example a phase difference, a frequency, a time delay, a density, a mass flow rate, a volume flow rate, a totalized mass flow, a temperature, a meter verification, pressure, and other information. More particularly, the one or more meter electronics 20 receive one or more signals, for example, from pickoffs 105, 105', and one or more temperature sensors 107, such as a resistive temperature detector (RTD), and use this information to measure a characteristic of a flowing material.

Figure 2:
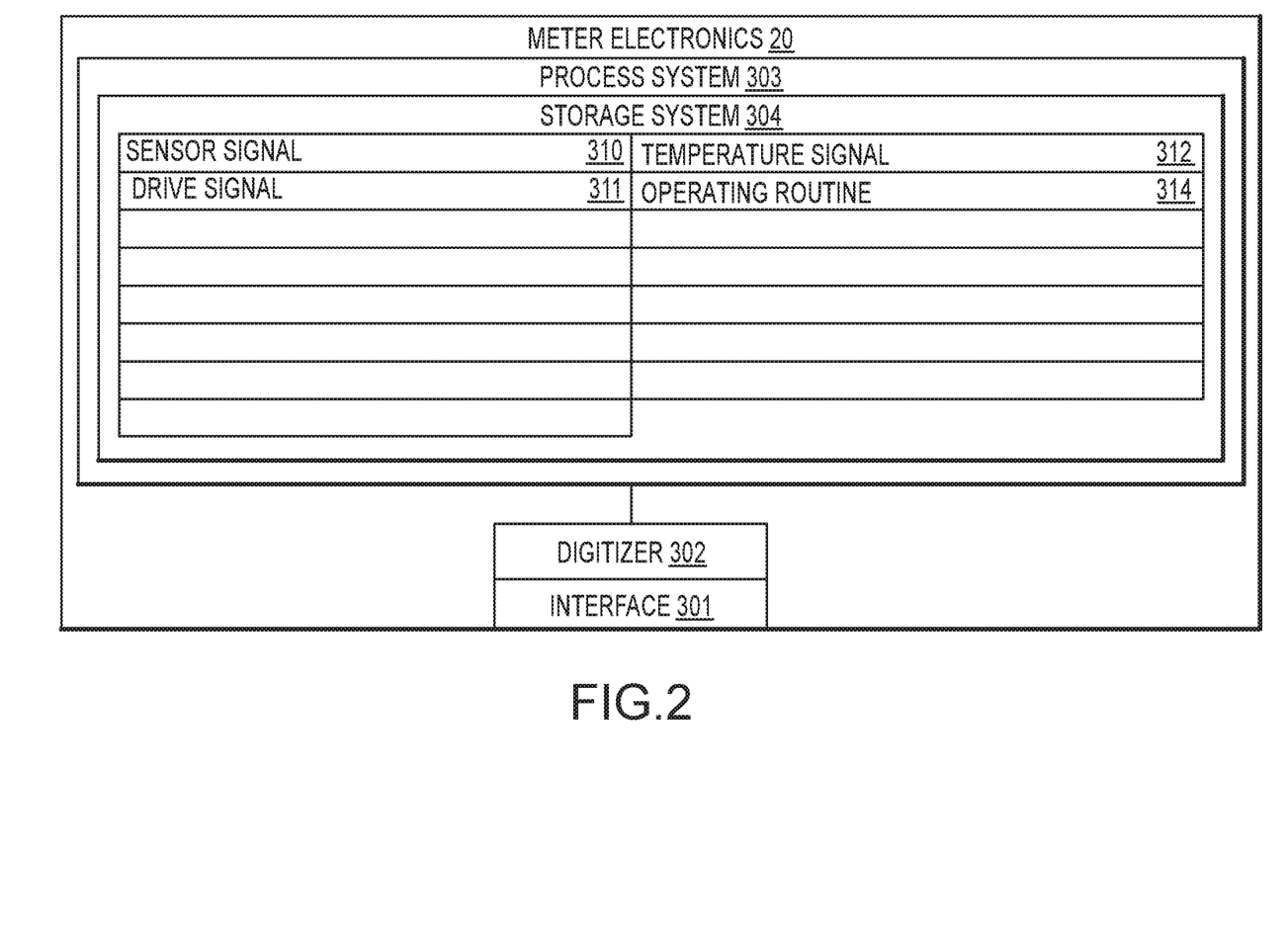
FIG. 2 shows meter electronics according to an embodiment.

FIG. 2 shows the meter electronics 20 according to an embodiment. The meter electronics 20 can include an interface 301 and a processing system 303. The processing system 303 may include a storage system 304. The storage system 304 may comprise an internal memory and/or may comprise an external memory. The meter electronics 20 can generate a drive signal 311 and supply the drive signal 311 to the driver 104. In addition, the meter electronics 20 can receive sensor signals 310 from the pickoffs 105, 105', such as pickoff/velocity sensor signals, strain signals, optical signals, or any other signals or sensors known in the art. In some embodiments, the sensor signals 310 can be received from the driver 104. The meter electronics 20 can operate as a densitometer or can operate as a mass flowmeter, including operating as a Coriolis flowmeter. It should be appreciated that the meter electronics 20 may also operate as some other type of vibrating sensor assembly and the particular examples provided should not limit the scope of the present invention. The meter electronics 20 can process the sensor signals 310 in order to obtain flow characteristics of the material flowing through the flow conduits 103A, 103B. In some embodiments, the meter electronics 20 may receive a temperature signal 312 from one or more resistive temperature detectors (RTD) sensors or other temperature sensors 107, for example.

The interface 301 can receive the sensor signals 310 from the driver 104 or pickoffs 105, 105', via leads 110, 111, 111'. The interface 301 may perform any necessary or desired signal conditioning, such as any manner of formatting, amplification, buffering, etc. Alternatively, some or all of the signal conditioning can be performed in the processing system 303. In addition, the interface 301 can enable communications between the meter electronics 20 and external devices. The interface 301 can be capable of any manner of electronic, optical, or wireless communication.

The interface 301 in one embodiment can include a digitizer 302, wherein the sensor signal comprises an analog sensor signal. The digitizer 302 can sample and digitize the analog sensor signal and produce a digital sensor signal. The digitizer 302 can also perform any needed decimation, wherein the digital sensor signal is decimated in order to reduce the amount of signal processing needed and to reduce the processing time.

The processing system 303 can conduct operations of the meter electronics 20 and process flow measurements from the sensor assembly 10. The processing system 303 can execute one or more processing routines, such as a general operating routine 314.

The processing system 303 can comprise a general purpose computer, a micro-processing system, a logic circuit, or some other general purpose or customized processing device. The processing system 303 can be distributed among multiple processing devices. The processing system 303 can include any manner of integral or independent electronic storage medium, such as storage system 304.

The processing system 303 processes the sensor signals 310 in order to generate a drive signal 311, among other things. The drive signal 311 is supplied to the driver 104 via lead 110 in order to vibrate the associated flow tube(s), such as the conduits 103A, 103B of FIG. 1.

It should be understood that the meter electronics 20 may include various other components and functions that are generally known in the art. These additional features are omitted from the description and the figures for the purpose of brevity. Therefore, the present invention should not be limited to the specific embodiments shown and discussed.

The techniques by which vibrating sensor assemblies, such as for example, Coriolis flowmeters or densitometers, measure a characteristic of a flowing material are well understood; therefore, a detailed discussion is omitted for brevity of this description.

As discussed briefly above, one challenge associated with sensor assemblies, such as Coriolis flowmeters, is the determination of an accurate FCF. If the FCF is not accurate, calculating the flow rate and various other flow measurements will typically include an error. As noted, the typical prior art approach to determine a FCF during an initial calibration process usually involves applying a predetermined pressure coefficient. Such calibration processes are generally known in the art and a detailed discussion is omitted for brevity of the description. Once a FCF is determined, flow measurements are corrected, during meter operation, by subtracting an initial zero offset from the measured time difference and multiplying this value with the FCF according to Equation (1). It should be appreciated that Equation (1) is merely provided as an example and should in no way limit the scope of the present invention, as other methods and/or equations are contemplated. Although Equation (1) is provided to calculate mass flow rate, it should also be appreciated that various other flow measurements may be affected by the zero offset, pressure coefficient, and FCF, so therefore, may also be adjusted as necessary. This general approach can fail to provide satisfactory results, as flowmeters have manufacturing tolerances such that a predetermined pressure coefficient value may not always be accurate.

In an embodiment, the mass flow rate of the flowmeter 5 may be determined by Equation (2) or its equivalent:

$$\dot{m} = FCF \cdot PF \cdot (\Delta T_{measured} - \Delta T_0) \quad (2)$$

Where:
PF=Pressure correction term

In an embodiment, PF comprises a value of approximately 1.0000. In an embodiment, an individualized PCV is calculated and applied to an individual flowmeter 5. It has been determined through experimentation that the PF does not necessarily remain constant from meter to meter—even for a given model that theoretically has the same specifications. This is likely due to the variation in conduit 103A, 103B stiffness from meter to meter caused by tolerances in the manufacturing process and tolerances in the vibrating tube(s) wall thickness.

In an embodiment, a pressure measurement is utilized in conjunction with the PCV, wherein the PCV is a pressure coefficient in the pressure correction term that is expressed as $(1+(P_A-P_B) \cdot PCV)$, as shown in Equation (3).

$$\dot{m} = FCF \cdot (1+(P_A-P_B) \cdot PCV) \cdot (\Delta T_{measured} - \Delta T_0) \quad (3)$$

Where:
PCV=pressure coefficient
$P_A$=Flow pressure
$P_B$=Base pressure at which FCF was determined It should be noted that an additional temperature correction term could be added to the right-hand side of the equation as a product. In an embodiment, the temperature correction term is expressed as $(1-T_C \cdot T)$, where $T_C$ is a temperature correction coefficient, and T is the operating temperature of a conduit 103A, 103B.

Figure 3:
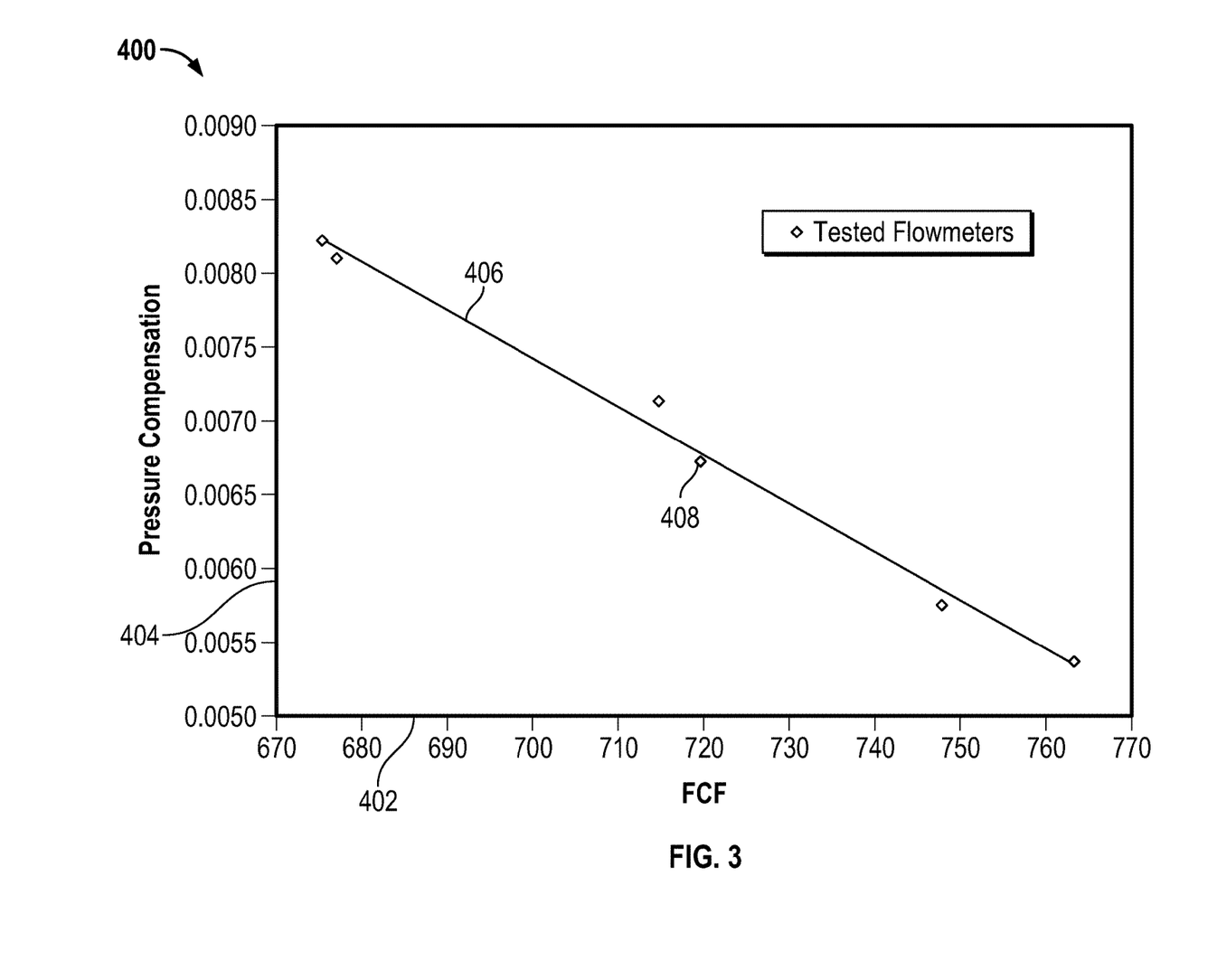
FIG. 3 is a graph describing a relationship between a flow calibration factor and a pressure coefficient.

Turning to FIG. 3, a graph 400 illustrates testing results for determining a unique Coriolis mass flowmeter's FCF, and the relationship between a particular flowmeter's FCF and that particular flowmeter's PCV. The x-axis 402 represents a measured Coriolis mass flowmeter's FCF, and the y-axis 404 represents the Coriolis mass flowmeter's PCV. A trend line 406 illustrates the linear relationship between the FCF and the PCV. Therefore, it will be clear to one skilled in the art that the unique Coriolis mass flowmeter's FCF is correlated to the unique pressure compensation value for each flowmeter. In an embodiment, an adjustment is made to the standard pre-determined pressure coefficient value that is used for each sensor assembly 10 based on the calibrated FCF.

Figure 4:
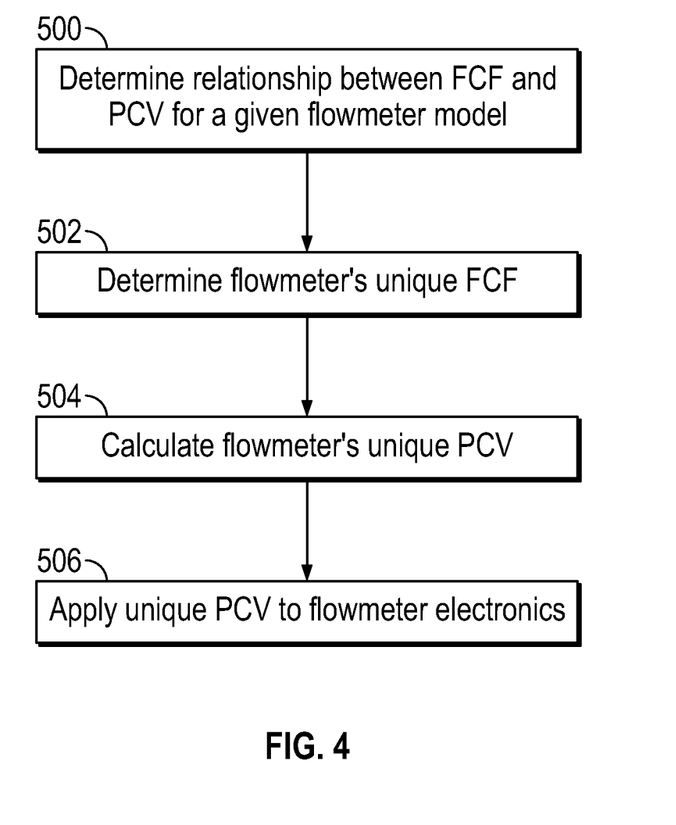
FIG. 4 is a flow chart describing a flowmeter calibration according to an embodiment.

Turning to FIG. 4, an embodiment of a method for calibrating a flowmeter 5 with a unique PCV is provided.

In step 500, the relationship between FCF and PCV is determined. As noted, this relationship is unique for each model/type/class of flowmeter. For example, a hypothetical model X flowmeter will have a different relationship between FCF and PCV as compared to the hypothetical model Y flowmeter. For example, without limitation, the relationship in FIG. 3 may be described approximately as $PCV = -3 \times 10^{-5} \cdot FCF + 0.03$. This, of course, will vary from flowmeter type to flowmeter type.

In step 502, a particular flowmeter's unique FCF is determined. The FCF reflects the material properties and cross-sectional properties of the conduit 103A, 103B. In the prior art, the FCF is determined by a calibration process prior to installation of the flow meter into a pipeline or other conduit. In the calibration process, a fluid is passed through the conduit 103A, 103B at a given flow rate, and the proportion between the phase difference and the flow rate is calculated. In one example, the flowmeter 5 is inserted into a calibration system having process connections that match those of the flowmeter 5. After insertion into the calibration system, the calibration process is performed. For example, this may comprise gravimetric standards or master meter transfer standards used as flow rate references during the calibration process. The fluid used within the calibration system and the meter under test has precisely known intrinsic and extrinsic fluid properties, e.g., temperature, density, viscosity, and volume. The meter under test performs flow measurements on this fluid. These measurements are compared with the known fluid properties, or flow rate references, to ascertain or validate a flow calibration factor or other calibration factors for the meter under test. In an embodiment, a pressure-indicating recorder and a temperature-indicating recorder are in communication with the flowmeter 5 during calibration. The pressure-indicating recorder and temperature-indicating recorder provide data that is used according to conventional practices in obtaining pressure and density measurements. Pressure and temperature data may also be utilized to perform volumetric measurements when the meter under test is a volumetric flow meter, such as a positive displacement meter or orifice meter. In operation, the meter under test receives flow liquid that passes through a series of upstream and downstream reference meters. A controller synchronizes these simultaneous measurements to avoid the possibility of obtaining flow measurements at different times, wherein the flow measurements may be influenced by pressure surges or pulses from the action of a pump.

In this step, an initial zero offset ($\Delta T_0$) may be determined in some embodiments. For the particular flowmeter 5 being set up, this entails placing the flowmeter 5 under zero-flow conditions, and reading the measured flow. The difference between zero and the measured flow is stored in the storage system 304 as the initial zero offset ($\Delta T_0$). Once the initial zero offset ($\Delta T_0$) is determined, the flow calibration factor (FCF) is established, which is the slope of the line that dictates the relationship between the measured time delay ($\Delta t_{measured}$) and the mass flow rate ($\dot{m}$). The FCF is also stored in the storage system 304.

In step 504, the particular flowmeter's unique PCV is determined. Since the FCF value was determined in step 502, and the relationship between the FCF and the PCV was determined in step 500, the PCV is now derivable. Turning again to the example of FIG. 3, the relationship, as noted above, is illustrated by trend line 406. Therefore, in the hypothetical situation where the FCF for a flowmeter 5 is approximately 720 (e.g. point 408), the PCV is approximately 0.0067.

In an embodiment, the PCV is a combination of two values. The first value is a base PCV, and the second value is an adjustment factor. The base PCV is a generic value that approximates a flowmeter's unique PCV. This would generically be applied to meter electronics 20 for all flowmeters of a particular class/type. The adjustment factor would be derived in step 504, and this would be added to the base PCV to yield a value equivalent to the particular flowmeter's unique PCV.

In step 506, the PCV may be programmed/input into meter electronics 20. Therefore, when the flowmeter 5 is operating, an accurate calibration that takes pressure compensation into account is realized. For example, Equation (2) could be used such that the FCF is used in conjunction with the PCV in determining mass flow rate and other fluid-related variables. Again, this equation is merely an example, and other equations and algorithms are contemplated. The storage system 304 therefore stores the PCV, and may apply it to the operating routine 314. Step 506 would typically be conducted as part of an initial factory set up.

It should also be noted that the PCV may be stored offline in an embodiment. In such cases, the flowmeter 5 would calculate a mass flow rate, and this value would be pressure compensated utilizing a device external to the flowmeter. Thus, Equation (4) could be, for example without limitation, applied as:

$$\dot{m}_{corrected} = \dot{m}_{measured} \cdot (1 + (P_A - P_B) \cdot PCV) \quad (4)$$

Where:
$\dot{m}_{corrected}$=Pressure compensated mass flow rate
$\dot{m}_{measured}$=Measured mass flow rate Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

We claim:

1. A method for calibrating a flowmeter under test comprising:
    determining a relationship between a flow calibration factor and a pressure coefficient value (PCV) using a plurality of pretested flowmeters;
    determining a unique flow calibration factor for the flowmeter under test;
    calculating a unique pressure coefficient value for the flowmeter under test with the unique flow calibration factor and the relationship between the flow calibration factor and the pressure coefficient value determined from the plurality of pretested flowmeters; and
    applying the unique pressure coefficient value to the flowmeter under test.

2. The method of claim 1, wherein the flowmeter is a Coriolis mass flowmeter.

3. The method of claim 1, wherein the step of determining a relationship between a flow calibration factor and a pressure coefficient value using a plurality of tested flowmeters comprises the step of determining an initial zero offset.

4. The method of claim 1, wherein the step of applying the unique pressure coefficient value to the flowmeter under test comprises storing the unique pressure coefficient value in a meter electronics.

5. The method of claim 1, comprising the step of measuring a process fluid introduced into the flowmeter under test, wherein the measurement is adjusted with the unique pressure coefficient value and the unique flow calibration factor.

6. The method of claim 5, wherein the step of measuring a process fluid comprises measuring a mass flow rate.

7. The method of claim 6, wherein the mass flow rate is determined using an equation comprising: $\dot{m} = FCF \cdot PCV \cdot (\Delta T_{measured} - \Delta T_0)$, wherein:
    $\dot{m}$ is a mass flow rate;
    FCF is the unique flow calibration factor;
    PCV is the pressure coefficient value;
    $\Delta T_{measured}$ is a measured time delay;
    $\Delta T_0$ is an initial zero offset.

8. The method of claim 6, wherein the mass flow rate is determined using an equation comprising: $\dot{m} = FCF \cdot (1 + (P_A - P_B) \cdot PCV) \cdot (\Delta T_{measured} - \Delta T_0)$, wherein:
    $\dot{m}$ is a mass flow rate;
    FCF is the unique flow calibration factor;
    PCV is the pressure coefficient value;
    $\Delta T_{measured}$ is a measured time delay;
    $\Delta T_0$ is an initial zero offset;
    $P_A$=Flow pressure; and
    $P_B$=Base pressure.

9. The method of claim 1, wherein the relationship between the flow calibration factor and the pressure coefficient for the class of flowmeter is linear.

10. The method of claim 1, wherein the unique pressure coefficient value comprises a base pressure coefficient value summed with an adjustment factor.

11. A flowmeter (5) configured to measure a property of a process fluid therein, comprising:
    a meter electronics (20) comprising a processing system (303) and a storage system (304);
    a plurality of pickoffs (105, 105') affixed to flowmeter (5) conduits (103A, 103B) in communication with the meter electronics (20);

a driver (104) affixed to flowmeter (5) conduits (103A, 103B) in communication with the meter electronics (20);

wherein the meter electronics (20) is configured to measure a fluid flow of a process fluid in a sensor assembly (10) and to determine at least one fluid characteristic of the process fluid;

wherein the meter electronics (20) stores a value representing a relationship between a flow calibration factor and a pressure coefficient value (PCV) derived from a plurality of pretested flowmeters, wherein the meter electronics (20) is configured to determine a unique flow calibration factor; and wherein the meter electronics (20) is configured to apply a unique pressure coefficient value to fluid characteristic calculations, wherein the unique pressure coefficient value is calculated using the unique flow calibration factor and the stored valued representing the relationship between the flow calibration factor and the pressure coefficient value determined from the plurality of pretested flowmeters.

12. The flowmeter (5) of claim 11, comprising a Coriolis mass flowmeter.

13. The flowmeter (5) of claim 12, wherein a mass flow rate is calculated and adjusted with the unique pressure coefficient value and the unique flow calibration factor.

14. The flowmeter (5) of claim 13, wherein the mass flow rate is determined using an equation comprising: $\dot{m}=\text{FCF}\cdot\text{PCV}\,(\Delta T_{measured}-\Delta T_0)$, wherein:

$\dot{m}$ is a mass flow rate;
FCF is the unique flow calibration factor;
PCV is the pressure coefficient value;
$\Delta T_{measured}$ is a measured time delay;
$\Delta T_0$ is an initial zero offset.

15. The flowmeter (5) of claim 13, wherein the mass flow rate is determined using an equation comprising: $\dot{m}=\text{FCF}\cdot(1+(P_A-P_B)\cdot\text{PCV})\cdot(\Delta T_{measured}-\Delta T_0)$, wherein:

$\dot{m}$ is a mass flow rate;
FCF is the unique flow calibration factor;
PCV is the pressure coefficient value;
$\Delta T_{measured}$ is a measured time delay;
$\Delta T_0$ is an initial zero offset;
$P_A$=Flow pressure; and
$P_B$=Base pressure.

16. The flowmeter (5) of claim 11, wherein the relationship between the flow calibration factor and the pressure coefficient is linear.

17. The flowmeter (5) of claim 11, wherein the unique pressure coefficient comprises a base pressure coefficient value summed with an adjustment factor.

\* \* \* \* \*